UNITED STATES PATENT OFFICE.

FORREST SHEPHERD, OF NEW HAVEN, CONNECTICUT.

WHITE PAINT.

Specification forming part of Letters Patent No. 284, dated March 18, 1835; Reissued July 19, 1837.

*To all whom it may concern:*

Be it known that I, FORREST SHEPHERD, formerly of Fredericksburg, in the county of Spottsylvania and State of Virginia, but now of New Haven, in the county of New Haven and State of Connecticut, have invented a new and useful preparation of white paint to be used in combination with oil in the same way in which white lead is now used; and I do hereby declare that the following is a full and exact description thereof.

I take the mineral known by the name of sulfate of barytes, barytes, or terra-ponderosa, and reduce it to a fine powder; after which, I mix it intimately with oil, and, if necessary, again grind it in the same way in which paint is usually ground. With this paint as a basis, any of the pigments now used with other kinds of white paint may be incorporated, and any desired tint, or shade of color, be thereby produced.

What I claim as my invention, or discovery, and wish to secure by Letters Patent, is—

The employment of the mineral, or native, sulfate of barytes, properly incorporated with oil as a white paint, or as a basis with which various pigments may be used in the process of painting.

FORREST SHEPHERD.

Witnesses:
THOS. P. JONES,
J. B. GRAY.

[FIRST PRINTED 1914.]